United States Patent [19]

Franklin

[11] 4,434,827
[45] Mar. 6, 1984

[54] TREE FELLER-BUNCHER

[76] Inventor: Gordon S. Franklin, 88 17th Ave., Deux Montagnes, Quebec, Canada, J7R 3Z2

[21] Appl. No.: 385,724

[22] Filed: Jun. 7, 1982

[51] Int. Cl.³ ............................ A01G 23/08; B27B 5/02
[52] U.S. Cl. .................................... 144/336; 144/3 D; 144/34 R; 144/34 B
[58] Field of Search .................. 144/3 D, 34 R, 34 B, 144/34 F, 335, 336

[56] References Cited

U.S. PATENT DOCUMENTS 4,014,373  3/1977  Smith ................................. 144/3 D
4,270,586  6/1981  Hyde et al. ...................... 144/34 R

FOREIGN PATENT DOCUMENTS 869684  10/1981  U.S.S.R. .............................. 144/3 D

Primary Examiner—Francis S. Husar
Assistant Examiner—Jorji M. Griffin

[57] ABSTRACT

Method and apparatus for felling and bunching trees is provided by means of a support mounted on a vehicle and a carriage mounted for movement along the support in a horizontal direction substantially perpendicular to the direction of movement of the vehicle. The carriage mounts a tree cutting mechanism and a grapple that grips the tree while it is being cut by the cut off mechanism. After the tree is cut the carriage is moved along the support to one end thereof and the grapple moved to a depositing position and releases the cut tree to the side of the path of travel of the vehicle. The present invention permits the vehicle to simply move backwards and forwards along a path to cut a swath through the trees while piling the cut trees immediately adjacent to but to one side of the swath cut by the equipment.

5 Claims, 6 Drawing Figures

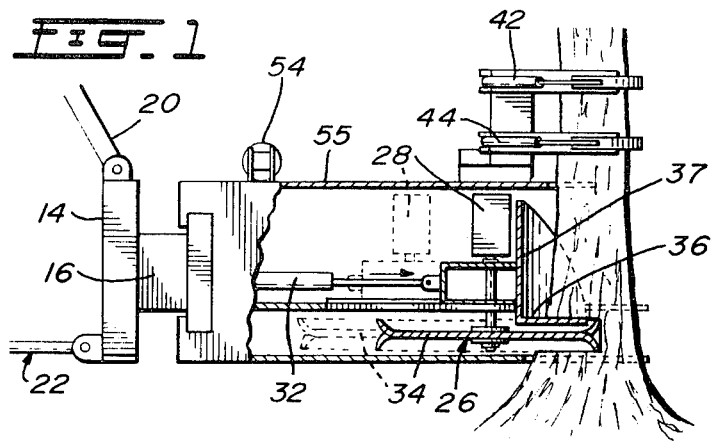
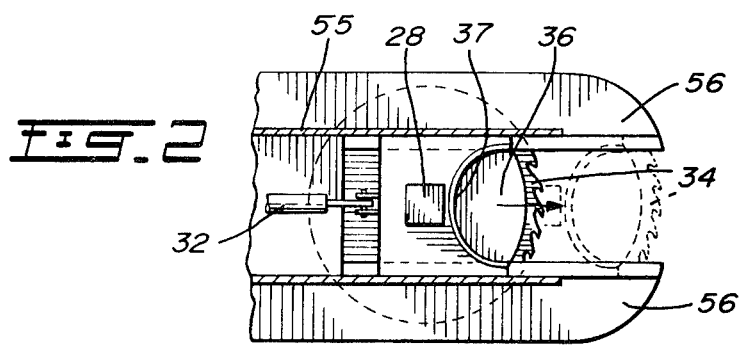
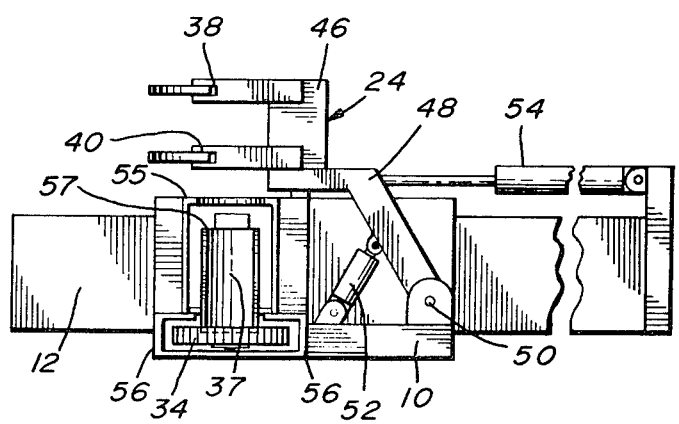

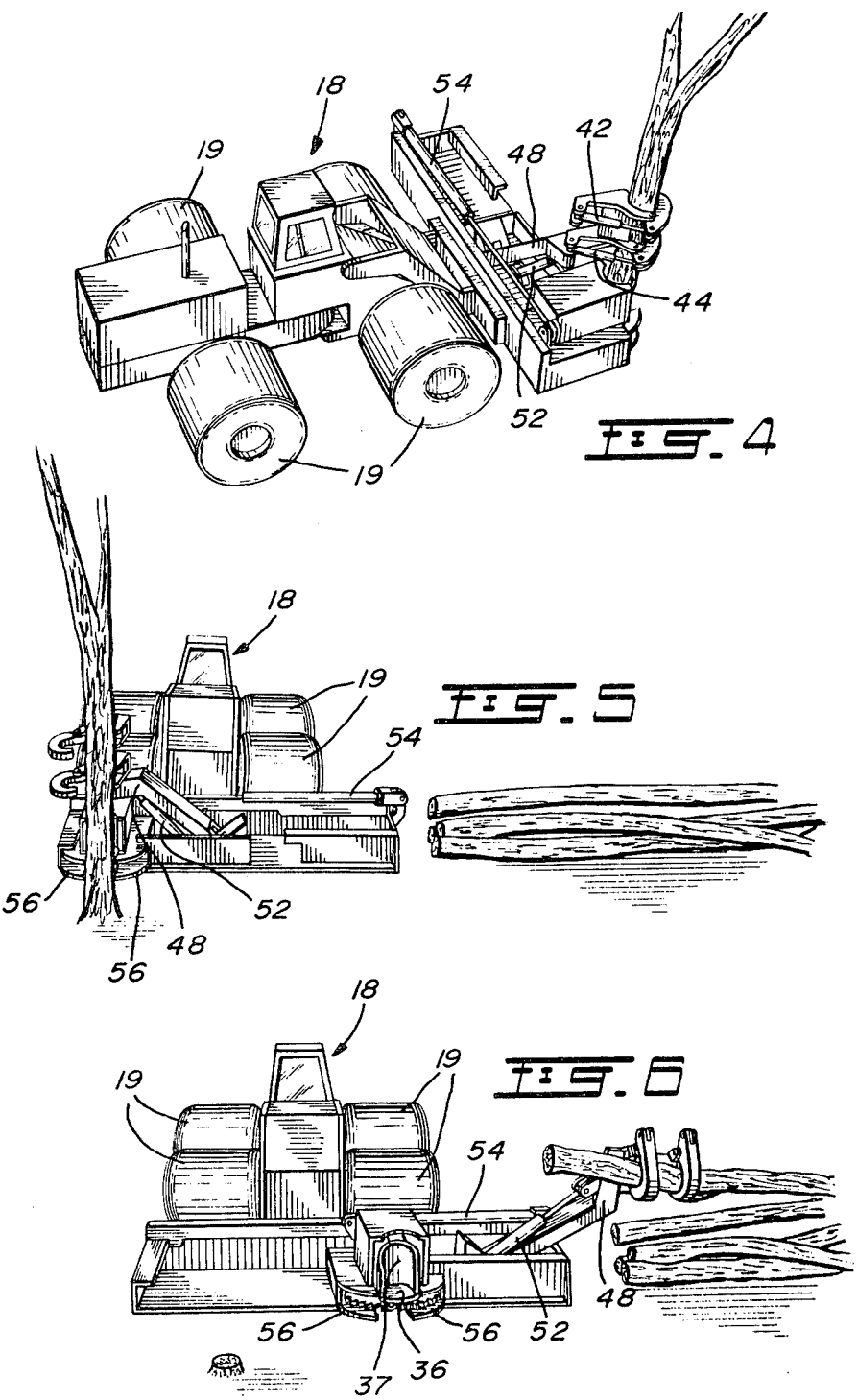

TREE FELLER-BUNCHER

FIELD OF THE INVENTION

The present invention relates to a feller-buncher. More particularly the present invention relates to a feller buncher adapted to travel in a substantially straight line to cut a swath of trees and lay the felled trees in a row adjacent to the path of travel.

BACKGROUND TO THE INVENTION

There are various forms of vehicles and equipment for felling and bunching trees. Some of the vehicles have tracks while others have high pressure rubber tires. Recently, relatively soft, wide tires have been used on vehicles. The type of vehicles used is normally determined by the type of terrain in which the logging is being done.

Mounted on these vehicles are a variety of different types of equipment for felling and in many cases bunching of trees. Probably the most widely used concept is that of a boom such as a knuckle boom having mounted at its free end a device for severing the tree and in many cases grapples for holding the tree so that it can be transported with the boom to a bunching location.

It is also known to provide felling-bunching equipment which has mounted on the front of a vehicle having a platform on which is mounted a feller or cut off means as well as means for tipping the tree as it is cut, whereby the tree may be felled in a specific direction relative to the vehicle or platform. Such devices are shown, for example, in Canadian patent No. 949835 issued June 25, 1974 to Dika and Canadian Patent No. 1002431 issued Dec. 28, 1976 to Albright.

BRIEF DESCRIPTION OF THE INVENTION

It is an object of the present invention to provide an improved feller-buncher wherein the felled trees are lined on the side of the path taken by the feller-buncher i.e. the feller-buncher travels much in the manner of a swather used in harvesting grain and simply cuts the trees and lays them over at the side of the path of travel.

Broadly, the present invention relates to a method and apparatus for the felling and bunching of trees. The apparatus broadly comprises support means to be mounted on a vehicle and to extend substantially horizontally in the direction substantially perpendicular to the direction of travel of the vehicle, a carriage mounted on the support means and moveable back and forth along the support means in said direction substantially perpendicular to the direction of movement of the vehicle; the carriage mounts means to fell a tree as well as grapple means, both of which are moveable on the carriage, the means to fell being moveable between an inactive and a cutoff position, the grapple means moves between a position to engage a tree as it is being cut and after it is cut to a depositing position thereby to deposit the tree at a location to the side of the path of travel of the vehicle.

The method of the present invention broadly comprises advancing the vehicle and laterally positioning the carriage along said support means into a position wherein the means to fell the tree can cut the tree while it is engaged by the grapple, supporting the tree in the grapple means and moving said carriage with the tree supported by the grapple means to a selected end of said support means and then moving the grapple supporting the tree into a depositing position relative to said carriage at said selected end and releasing said grapple to deposit the tree, continuing these operations in sequence to cut a swath of trees.

BRIEF DESCRIPTION OF THE DRAWINGS

Further features, objects and advantages will be evident from the following detailed description of the preferred embodiments of the present invention taken in conjunction with the accompanying drawings in which:

FIG. 1 is a schematic side view with parts omitted illustrating the carriage mounted on the support means and with the cut-off mechanism exposed through the end of the carriage.

FIG. 2 is a plan view of the embodiment shown in FIG. 1 with the grappling mechanism moved out of the way to show the cut-off mechanism.

FIG. 3 is a schematic front view of the support means and the carriage.

FIG. 4 illustrates the present invention in a position to cut a tree.

FIG. 5 is a front view illustrating the present invention about to cut a tree.

FIG. 6 is a front view showing the carriage moved to the right in the position to deposit the tree to the side of the path of movement of the feller-buncher.

DESCRIPTION OF THE PREFERRED EMBODIMENTS

As shown FIG. 1 the suitable carriage generally indicated as 10 is mounted on the support bar 12 which in turn is mounted on a mounting plate 14 via support spacer 16.

The plate 14 is mounted on a vehicle 18 (see FIGS. 4, 5 and 6) via suitable linkages such as those shown for example at 20 and 22 in FIG. 1. In the illustrated arrangement (see FIGS. 3, 4 or 5) the vehicle is provided with wide low pressure tires 19 specially adapted to travel over soft ground while minimizing damage to the terrain.

Mounted on the carriage 10 is a suitable grapple assembly generally indicated at 24, and a cut-off mechanism generally indicated at 26.

The cut off mechanism 26 as schematically illustrated is composed of a drive motor preferably a hydraulic motor 28 which is supported on a track 30 and moved forward and backward between an inactive and a cutoff position by a piston and cylinder arrangement generally indicated at 32. Hydraulic motor 28 has a large circular saw 34 mounted on the the end of its drive shaft. This saw is provided with relatively wide kerf so that a significant band is cut out of the tree as it is severed. The height or width of the kerf relative to the thickness of the blade is such that a support plate 36 that is a part of the rigid assembly including the motor 28 is received within the kerf cut by the saw. A suitable curved backing plate 37 extends up from the plate 36 and serves to contain a cut tree.

The grapple assembly 24 in the illustrated arrangement includes a pair of grapple means 38 and 40 which are preferably activated by a hydraulic cylinders 42 and 44 respectively (see FIG. 1) to clamp and hold the tree. These grapple means 38 and 40 are mounted upon a support column 46 which in turn is mounted on an arm 48 that is pivotably mounted on the carriage 10 via pivot 50. The arm 48 is swung from the position shown in FIGS. 3, 4 and 5 to the depositing position shown in FIG. 6 via suitable piston and cylinder arrangement 52.

The carriage 10 is moved along the support bar 12 via a suitable piston and cylinder arrangement 54 (see FIG. 2).

The carriage 10, cut-off mechanism 26, grapple assembly 24, etc. are all substantially conventional mechanisms i.e. the carriage 10 is provided with the normal housing 56, housing 55 with the projection 56 extending therefrom on opposite sides of and in position to protect the sides of the saw 34 as it is advanced to cutting position. A suitable opening 57 (FIG. 3) is formed in the front of the carriage 10 in line with the saw 34 and structure formed by the plates 36 and 37 to pass into position to engage and support a tree as it is cut by the saw 34.

In operation the vehicle 18 is normally moved back and forth in a substantially straight line to cut a swath through the trees and the cut-off mechanism 26 is aligned with the tree to be cut by a lateral movement of the carriage 10, substantially horizontal and perpendicular to the direction of movement of the vehicle, along the support bar 12 by actuation of the piston and cylinder 54 or the like. With the carriage so aligned, the vehicle is advanced to position the carriage 10 so that the tree is positioned between the positions 56 and then the grapple means 38 and 40 are actuated to hold the tree while the saw 34 is advanced via the piston and cylinder arrangement 32 to cut-off the tree adjacent to the base thereof. As the saw cuts through the tree it cuts a band of wood from the tree. The support plate 36 advances with the saw and is positioned beneath the cutoff portion of the tree. This plate 36 and the curved plate 37 aid in supporting the tree as the carriage 10 is moved by piston and cylinder 54 to its depositing position in the illustrated arrangement always to the extreme left relative to the vehicle (to the right in FIGS. 4 and 5). The grapple assembly 24 mounted on arm 48 is then tilted to a depositing position as shown in FIG. 6 via piston and cylinder 52, the grapple means 38 and 40 released and the cut tree is deposited. The operation automatically arranges the butts of the trees in a row adjacent to the side of the path travelled by the vehicle.

By moving the cut-off mechanism and the grapple assembly on the carriage 10 laterally or perpendicular to the direction of movement of the vehicle 18, the vehicle need only move forward or backwards to properly position the carriage for cutting the next tree as above described. The carriage is positioned on the bar 12 in alignment with the tree and then the vehicle advanced to position the tree between the projection at which point the grapple means 38 and 40 are actuated to grab the tree, and the cut-off mechanism 26 is advanced to cut the tree off at a point adjacent to the ground.

This action is repeated as the vehicle moves in a substantially straight line along the swath of trees to be cut and piles the trees in a substantially straight line along the side of the cut swath.

By simplifying the movement so that the vehicle need only travel back and forth with the lateral movement being accomodated by the carriage 10 moving along bar 12, it is an easy matter for an operator to align the carriage with the tree and then move the vehicle and thus the carriage, into position to cut the tree. After the tree is in position the operations of the cut-off mechanism, grapple assembly, and the carriage may be automatically controlled by a suitably programmed computer to grip and cut-off a tree then move the carriage to depositing position and tip the tree with the grapple assembly and finally release the tree from the grapple means.

Having described the invention, modifications will be evident to those skilled in the art without departing from the spirit of the invention as defined in the appended claims.

I claim:

1. A tree feller-buncher comprising a support means, means to mount said support means on a vehicle, a carriage mounted on said support means for movement back and forth on said support means in a substantially horizontal direction substantially perpendicular to the direction of movement of said vehicle to and from one end of said support means, means to fell a tree moveably mounted on said carriage for movement between an inactive position and a cutoff position, an arm support means pivotally mounted on said carriage, grapple means mounted on said arm support means, for movement of said grapple means between a first engaging and clamping position for receiving a tree in said direction of movement of said vehicle, said tree being in its normally vertical attitude, and for clamping said tree to be cut by said means to fell, and a second position for depositing outwardly of said carriage to release a cut tree in a substantially horizontal attitude and at about a right angle to the side of a path along which said vehicle moves, and thereby to lay said cut tree on said side of said path and at about right angle thereof.

2. A tree feller buncher as defined as in claim 1 wherein said means to fell comprises a circular saw adapted to be moved relative to said carriage to cut through said tree to be felled.

3. An apparatus as defined in claim 2 further comprising a support plate forming part of said means to fell said support plate being positioned immediately adjacent to said circular saw and adapted to be received within the kerf cut by said saw when said saw cuts a slot through the tree to be felled, said support plate supporting said tree together with said grapple means after said tree is cut.

4. An apparatus as defined in claims 1, 2 or 3 wherein said grapple means moves to said depositing position when said carriage is moved to said one end of said support means.

5. A method of felling and bunching trees with a vehicle having mounted on its front end a support means extending substantially horizontally, and substantially perpendicular to the direction of advance of said vehicle and a carriage mounted on said support means for movement back and forth along said support means perpendicular to said direction, said carriage having means to fell a tree, moveably mounted thereon for movement between an inactive and a cutoff position as well as an arm support means pivotally mounted thereon, grapple means mounted on said arm support means for movement of said grapple means for engaging in said direction of advance of said vehicle, a tree in its normally vertical attitude position to a depositing position, to release a cut tree in a substantially horizontal attitude, said method comprising laterally positioning said carriage means on said support means and advancing said vehicle into a position wherein said means to fell can cut a tree and said grapple means by said direction of advance of said vehicle can engage said tree, clamping said tree in its normally vertical attitude, with said grapple means, and cutting said tree, maintaining said clamping of said cut tree in said grapple means while moving said carriage to one end of said support means and moving said arm support means and thereby displacing said grapple means outwardly of said carriage in the direction of said one end, supporting said tree, to said depositing position and thereby displacing said cut tree from its normally vertical attitude to a substantially horizontal attitude, and when said carriage is at said one end and said support means is outwardly of said carriage releasing said grapple means to deposit said tree, at about a right angle to the side of a path along which said vehicle moves and repeating said operations to fell further trees.

* * * * *